Patented June 4, 1929.

1,716,273

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

XANTHATE MIXTURE.

No Drawing.   Application filed July 16, 1926. Serial No. 123,025.

In copending applications, Serial No. 272,567, filed January 22, 1919; Serial No. 281,124, filed March 7, 1919; Serial No. 335,937, filed November 5, 1919; and Serial No. 435,355, filed January 6, 1921, I have set forth a process for the vapor phase catalytic oxidation of hydrocarbons such as petroleum, petroleum fractions, shale oil or its fractions, or the oils obtained from the low temperature distillation of coal. In said process the vaporized hydrocarbon is mixed with air in regulated proportions and the heated mixture is passed over a catalytic layer containing preferably the oxides or compounds of vanadium or molybdenum or other metals of similar general characteristics. The temperature is usually maintained between 170° and 500° C. The condensed products of such partial oxidation are highly hydroxylated and extend from alcohols through aldehyde alcohols to aldehydic hydroxy acids and keto hydroxy acids. I may prepare xanthates from any of the groups in such condensates, or a mixture of xanthates for a given group or I may treat the product as a whole to xanthates. The total xanthate product is preferred for some purposes, and for other purposes the xanthate mixture which is prepared after the acids and saponifiable bodies have been removed, is preferred.

While I may apply the xanthating reagents, such as carbon bisulphide and alkaline hydroxide directly to the liquid oxidized mixture or any fraction thereof; in most cases I prefer to first employ the extraction method set forth in my copending application Serial No. 745,024, filed October 21, 1924 in order to obtain all or the greater part of the hydroxyl compounds in a more concentrated form. This extraction process consists in brief of extracting the more highly oxygenated bodies from the complex oxidation mixture by means of lower molecular weight alcohols, such for example, as ethanol or methanol, which alcohols are diluted with a proper and regulated amount of water or other diluent to obtain the fractional solution effect desired. As set forth in said application, when such alcohols are diluted a selective operation is obtained and a percentage of extraction can be changed by changing the amount of water or other diluent added. The extracted alcohol or alcohols are of higher molecular weight than amyl alcohol.

If the extraction method is employed, I may, in treating the more highly concentrated oxygenated bodies, proceed at once with the xanthating reaction without removal of saponifiable substances; especially in the preparation of xanthated oils for insecticide or for flotation use.

Since most of the acids, esters, and esterlike bodies in the mixture are hydroxylated, the xanthated product contains the xanthates of these bodies together with the straight alcohol xanthates and the hydroxy-aldehyde and hydroxy-ketone xanthates. This method of xanthating without previous saponification is preferred only when xanthated oils are desired for certain special purposes, such, for example, for flotation and insecticide use. When the saponified substances are left in the mixture before xanthating, the amount of xanthates remaining dissolved in the oil is much larger.

Another method which I may employ is to treat the above recited alcoholic extract (after removal of the alcohol used in extracting) with caustic alkali to remove free acids and saponifiable substances, such as esters and lactones, previous to xanthating. This caustic treatment also causes a reaction with a considerable part of the aldehydes to convert them into alcohols and acids. After suitable washing to remove the soaps dissolved in the oil I then proceed with the xanthating reaction.

*Example A.*—In order to illustrate the procedure I will now give a description of certain examples in which I produced a mixture of sodium xanthates in the case where saponifiable products were removed.

*1. Preparation of sodium xanthates from oxidized oil.*

The oil used was an oxidized oil produced from a mixture of equal parts of Wyoming kerosene and Wyoming gas oil.

*Extraction.*—To extract the greater part of the alcohols and hyroxylated bodies in the oxidation mixture, 28 liters of the oil were mixed with 28 liters of Columbian spirits (99.5% methyl alcohol) and 420 cc. of water were added. The non-soluble oil rising to the surface after agitation of the two liquids was skimmed off, and the alcohol solution poured into a still and the methanol and water distilled off. The remaining "extract" was about 4 liters.

2. Saponification.

150 cc. of the above extract was boiled under an invert condenser with 20 grams of dry pulverized caustic soda for six hours. After this "dry" saponification the oil was repeatedly washed with boiling water to remove the soaps. About 15% of shrinkage in the oil volume resulted in this removal of the saponified substances.

3. Xanthation.

To 100 cc. of the above extract after removal of the saponifiable material I added 10 grams (10 mesh) dry caustic soda and 40 cc. of carbon bisulphide and agitated the mixture seven hours. The xanthated oil was washed once with cold water, and the water extract on being evaporated gave about 12 grams of a reddish brown mixture of xanthates which separated out in crystalline form. In this case a further removal of xanthates from the oil was not made since the oil as it remained after this extraction and the distilling off of excess carbon bisulphide was used for flotation tests.

The flotation test with such oils showed that on certain copper ores the action was better than with other commercial flotation oils. The xanthated products of my partial oxidation mixture show a remarkable speed in lifting the mineral, this being much rapid than even in the case of pine oil having ordinary ethyl potassium xanthate used therewith. My xanthated product may be used either by itself or as an addition to my oxidized oil previous to xanthating.

*Example B.*—Preparation of potassium xanthates from oxidized oil extract without preliminary removal of saponifiable matter.

In this preparation the carbon bisulphide was properly used in great excess in order to complete the reaction, the excess being thereafter removed by distillation. The potassium hydroxide was used in the theoretical amount required to neutralize free acids and saponify all saponifiable material, in addition to reacting with all xanthate forming material in the oil. The mixture was 100 cc. of the extract from the liquid partial oxidation product, 13.2 grams of potassium hydrate and 40 cc. of carbon bisulphide. This mixture was heated to the boiling point of the carbon bisulphide (47° C.) under a reflux condenser for six hours.

On cooling this material, 16 grams of xanthate mixture separated out. The oil was then added just enough to distill off the excess carbon bisulphide. This xanthated oil showed by analysis 2.14% of sulphur, practically all of which represents xanthates dissolved in the oil. The xanthated oil from this experiment was used in flotation tests and showed remarkable selective action, substantially no gangue being carried up with the values. In addition to the use of xanthates either with other oils or in admixture, as in the case of the above xanthated oils in the flotation industry, I have found that water solutions of these high molecular weight xanthates are very valuable as insecticides. I may also use emulsions of the above xanthated oils as insecticides when such xanthated oils are prepared either with or without the saponifiable substances.

Actual tests of my xanthates in the insecticide and fungicide field have shown remarkable results in many desirable characteristics, such as spreading quality, killing of insects, not injuring the foliage, etc.

For insecticide use the xanthates may be modified, as for example, by taking a mixture of my potassium or sodium xanthates and preparing the calcium xanthates for use as a dry powder insecticide. For example, I may prepare xanthates of organic bases and the hydroxyl compounds of the above oxidized oils.

Another use for these higher xanthates (or those of lead and zinc) lies in their use as accelerators in rubber vulcanizing. For this purpose my xanthates have certain desirable properties lacking in the ordinary ethyl alcohol xanthates since the action of the latter is too violent as a rubber accelerator.

Variations may be made in the partial oxidation process as well as in the xanthating steps; the extracted parts or fractions or the whole of the liquid condensed oxidation product may be used and other variations may be made without departing from my invention.

I claim:

1. As a new article of manufacture, a mixture of xanthates of the alcohols of higher molecular weight than amyl alcohols.

2. As a new article of manufacture, a mixture of xanthates of the alcohols of higher molecular weight than amyl alcohols and containing xanthates of different molecular weights.

3. As a new article of manufacture, a mixture of xanthates of alcohols of different molecular weights.

4. As a new article of manufacture, a mixture of xanthates of alcohols of different molecular weights, at least some of the bodies being of higher molecular weight than amyl alcohol.

In testimony whereof I have hereunto set my hand.

JOSEPH HIDY JAMES.